(12) United States Patent
Grosse Brinkhaus et al.

(10) Patent No.: US 9,493,660 B2
(45) Date of Patent: Nov. 15, 2016

(54) USE OF BISMUTH SUBNITRATE IN ELECTRO-DIPPING PAINTS

(75) Inventors: Karl-Heinz Grosse Brinkhaus, Nottuln (DE); Margret Neumann, Münster (DE); Oliver Johannpoetter, Greven (DE); Peter Lux, Bergkamen (DE)

(73) Assignee: BASF Coatings GmbH, Munster (DE)

( * ) Notice: Subject to any disclaimer, the term of this patent is extended or adjusted under 35 U.S.C. 154(b) by 383 days.

(21) Appl. No.: 12/673,202

(22) PCT Filed: Aug. 13, 2008

(86) PCT No.: PCT/EP2008/006642
§ 371 (c)(1),
(2), (4) Date: Feb. 12, 2010

(87) PCT Pub. No.: WO2009/021719
PCT Pub. Date: Feb. 19, 2009

(65) Prior Publication Data
US 2011/0094890 A1    Apr. 28, 2011

(30) Foreign Application Priority Data
Aug. 16, 2007  (DE) .................. 10 2007 038 824

(51) Int. Cl.
| | | |
|---|---|---|
| *C25D 9/08* | (2006.01) | |
| *C09D 163/02* | (2006.01) | |
| *C09D 5/44* | (2006.01) | |
| *C08G 18/08* | (2006.01) | |
| *C08G 18/58* | (2006.01) | |
| *C08G 18/80* | (2006.01) | |
| *C08G 59/62* | (2006.01) | |

(52) U.S. Cl.
CPC ......... *C09D 5/4496* (2013.01); *C08G 18/0814* (2013.01); *C08G 18/581* (2013.01); *C08G 18/8019* (2013.01); *C08G 59/621* (2013.01)

(58) Field of Classification Search
CPC ........... C09D 5/4496; C08G 18/0814; C08G 18/581; C08G 18/8019; C08G 59/621
USPC .......................................... 204/506; 524/415
See application file for complete search history.

(56) References Cited

U.S. PATENT DOCUMENTS

| | | | |
|---|---|---|---|
| 3,922,253 A | 11/1975 | Jerabek et al. | |
| 4,458,054 A | 7/1984 | Schmozer et al. | |
| 4,711,937 A | 12/1987 | Paar | |
| 4,808,658 A | 2/1989 | Walz et al. | |
| 4,865,704 A | 9/1989 | Saatweber et al. | |
| 5,003,025 A | 3/1991 | Dobbelstein et al. | |
| 5,021,502 A | 6/1991 | Patzschke et al. | |
| 5,324,404 A | 6/1994 | Ott et al. | |
| 5,330,839 A | 7/1994 | Yasuoka et al. | |
| 5,554,700 A | 9/1996 | Schipfer et al. | |
| 5,670,441 A * | 9/1997 | Foedde et al. ................. | 502/200 |
| 5,869,198 A | 2/1999 | Erne et al. | |
| 5,908,912 A | 6/1999 | Kollah et al. | |
| 6,274,649 B1 | 8/2001 | Ott et al. | |
| 6,645,363 B2 * | 11/2003 | Tomizaki et al. ............. | 204/489 |
| 6,887,360 B2 | 5/2005 | Retzlaff et al. | |
| 7,211,182 B2 * | 5/2007 | Lehmann et .................. | 204/486 |
| 2002/0050457 A1 * | 5/2002 | Sakamoto et al. ............ | 204/488 |
| 2007/0089996 A1 * | 4/2007 | Kojima ................ | C09D 5/4488 205/317 |

FOREIGN PATENT DOCUMENTS

| | | |
|---|---|---|
| CN | 1878835 A | 12/2006 |
| DE | 1907914 | 10/1969 |
| DE | 3300570 A1 | 7/1984 |
| DE | 3518732 A1 | 11/1986 |
| DE | 3738220 A1 | 5/1989 |
| DE | 4126476 A1 | 2/1992 |
| DE | 69201259 T2 | 6/1995 |
| DE | 4423139 A1 | 1/1996 |
| DE | 4434593 A1 | 4/1996 |
| DE | 19618379 A1 | 11/1997 |
| DE | 19703869 A1 | 8/1998 |
| DE | 10001222 A1 | 8/2001 |
| DE | 10236350 A1 | 2/2004 |
| DE | 102005057853 A1 | 6/2007 |
| DE | 102007038824 A1 | 2/2009 |
| EP | 0082291 A1 | 6/1983 |
| EP | 0178531 A1 | 4/1986 |
| EP | 0227975 A1 | 7/1987 |
| EP | 0261385 A2 | 8/1987 |
| EP | 0234395 A2 | 9/1987 |
| EP | 0245786 A2 | 11/1987 |
| EP | 0310971 A2 | 9/1988 |
| EP | 0333327 A1 | 9/1989 |
| EP | 0414199 A2 | 2/1991 |
| EP | 0433783 A1 | 6/1991 |
| EP | 0456270 A1 | 11/1991 |
| EP | 0476514 A1 | 3/1992 |

(Continued)

OTHER PUBLICATIONS http://www.lookchem.com/cas-130/1304-85-4.html, 2008.*
Perry (Handbook of Inorganic Compounds, Second edition, CRC Press 2011, pp. 67 and 70-71, http://www.crcnetbase.com/doi/pdfplus/10.1201/b10908-2).*
International Preliminary Report on Patentability for International application No. PCT/EP2008/006642 dated Mar. 2, 2010.
International Search Report for International Application No. PCT/EP2008/006642 dated Sep. 17, 2009.
Written Opinion for International Application No. PCT/EP2008/006642 filed on Aug. 13, 2008.
HEK GmbH, "Bismuth Subntrate (light and heavy)", Technical Data Sheet, MCP HEC—GMBH Div. Metals & Chemicals, Jan. 3, 2007, Lubeck, Germany, 2 pages.

(Continued)

*Primary Examiner* — Kishor Mayekar
(74) *Attorney, Agent, or Firm* — Servilla Whitney LLC

(57) ABSTRACT

Cathodically depositable electrocoat materials comprising basic bismuth nitrate, further comprising at least one binder having reactive functional groups and at least one crosslinker containing the complementary reactive functional groups which are able to enter into thermal crosslinking reactions.

4 Claims, 1 Drawing Sheet

(56) References Cited

FOREIGN PATENT DOCUMENTS

| | | |
|---|---|---|
| EP | 0505445 B1 | 9/1992 |
| EP | 0595186 A1 | 5/1994 |
| EP | 0639660 A1 | 2/1995 |
| EP | 0642558 B2 | 3/1995 |
| EP | 0690106 A1 | 6/1995 |
| EP | 0739389 B1 | 10/1996 |
| EP | 0817684 B1 | 1/1998 |
| EP | 0927232 B1 | 7/1999 |
| EP | 1163302 B1 | 12/2001 |
| EP | 0961797 B1 | 4/2003 |
| EP | 1342757 A1 | 9/2003 |
| EP | 1510558 A1 | 3/2005 |
| EP | 1518906 A1 | 3/2005 |
| GB | 1239143 A | 7/1971 |
| GB | 2368302 A | 5/2002 |
| JP | 2002066441 A | 3/2002 |
| JP | 2002086052 A | 3/2002 |
| JP | 2004137367 A | 5/2004 |
| JP | 2008150654 A | 7/2008 |
| WO | WO8702717 A1 | 5/1987 |
| WO | WO9402543 A1 | 2/1994 |
| WO | WO98/10024 A1 | 3/1998 |
| WO | WO98/33835 A1 | 8/1998 |
| WO | WO9843684 A1 | 10/1998 |
| WO | WO0151570 A1 | 7/2001 |
| WO | WO2007062953 A1 | 6/2007 |

OTHER PUBLICATIONS

English Translation of International Preliminary Report on Patentability for International Application No. PCT/EP2009/002185 issued Oct. 5, 2010, 8 pages.

International Search Report for International Application No. PCT/EP2009/002185 mailed Aug. 5, 2009.

English Translation of Written Opinion for International Application No. PCT/EP2009/002185 mailed Aug. 5, 2009.

Electronic Space Products International, Material Safety Data Sheet: Zirconium Nitrate, May 2002, 3 pages, Ashland, Oregon.

Acros Organics, Material Safety Data Sheet: Neodymium(I-II)Nitrate Hexahydrate, 99.99%, Jul. 20, 2009, Revision No. 6, 4 pages, Fair Lawn, New Jersey.

Acros Organics, Material Safety Data Sheet: Zinc Nitrate Hexahydrate, 98%, Jul. 20, 2009, Revision No. 5, 4 pages, Fair Lawn, New Jersey.

Carolina Biological Supply Company, Material Safety Data Sheet: Bismuth Nitrate, Pentahydrate, Nov. 14, 2012, 3 pages, Burlington, North Carolina.

Electronic Space Products International, Material Data Safety Sheet: Yttrium Nitrate, Jul. 1994, 3 pages, Ashland, Oregon.

Miersch, Linda, et al., Chemistry European Journal 2011, 17, 6985-6990.

Römpp, Georg Thieme Verlag KG, "Bismutnitrate".

Römpp, Georg Thieme Verlag KG, "sub".

\* cited by examiner

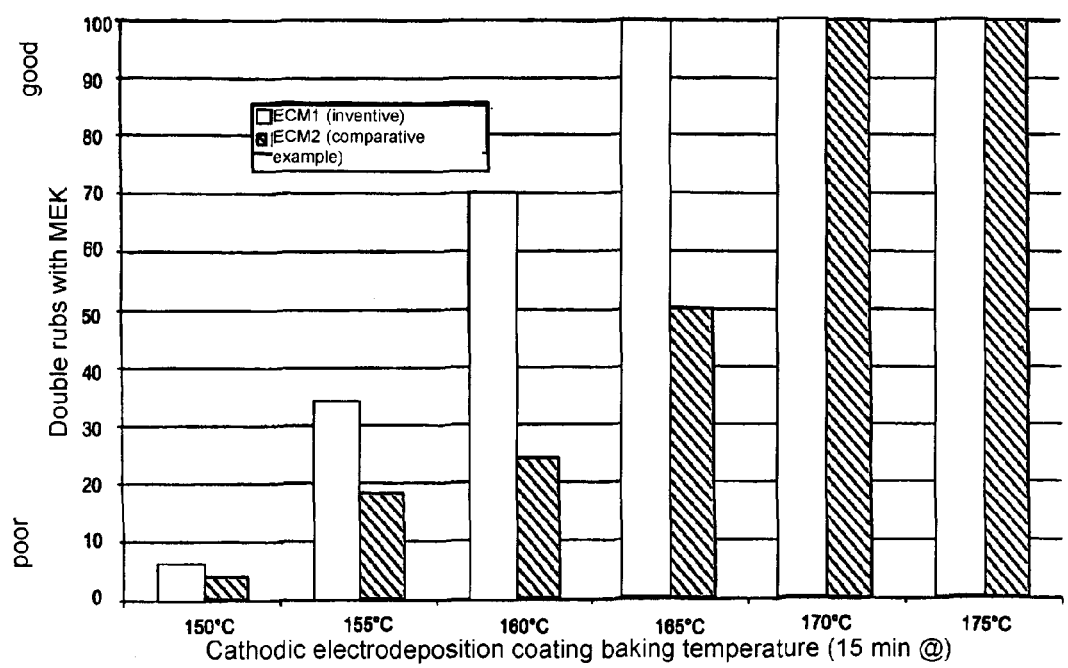

USE OF BISMUTH SUBNITRATE IN ELECTRO-DIPPING PAINTS

CROSS REFERENCE TO RELATED APPLICATIONS

This application is a National Phase Application of Patent Application PCT/EP2008/006642 filed on 13 Aug. 2008, which claims priority to DE 102007038824.3, filed 16 Aug. 2007, both of which are hereby incorporated by reference in their entirety.

FIELD OF THE INVENTION

The invention relates to cathodically depositable electrocoat materials comprising bismuth compounds, to a process for producing these electrocoat materials, and to their use.

BACKGROUND OF THE INVENTION

There are numerous examples known from the patent literature of the production of electrocoat materials. Compounds of tin and/or of bismuth, in particular, are employed as crosslinking catalysts in these materials. In recent times, the bismuth compounds have been used preferentially as crosslinking catalysts, since in addition to their high activity they also possess a low toxicity as compared with the tin compounds. The use of bismuth compounds as catalysts in the formation of urethane structures from isocyanate groups and hydroxyl groups is already well established (J. H. Saunders and K. C. Frisch, Polyurethanes, Chemistry and Technology from High Polymers, Vol. XVI, Part 1, Interscience Publishers, a division of John Wiley and Sons, New York, 4th Printing, July 1967, page 167). To date, however, the use of bismuth compounds as catalysts in connection with the production of electrocoat materials has been very limited. In EP 0 642 558 the bismuth compounds that are candidates for the use of electrocoat materials are significantly restricted, since the readily available salts with relatively long-chain acids, such as bismuth octanoate and bismuth neodecanoate, for example, cause disruptions as a result of oily exudations when used in cationic binders. Furthermore, as a result of being mixed into the binder or into a pigment paste, inorganic bismuth compounds are said to be difficult to disperse and in this form to have only a low catalytic activity. European patent EP 0 739 389 describes a simplified process for producing a corrosion control coating by means of electrodeposition coating, where the electrodeposition coating material comprises bismuth lactate or bismuth dimethylpropionate. Further possible bismuth compounds are mentioned, but without any details; in particular, the examples use only the salts of lactic acid and dimethylpropionic acid. Bismuth subnitrate is not mentioned. Further bismuth complexes based on amino acids (EP 0 927 232) or alkanesulfonic acids (EP 1 163 302) are described as being useful and stable catalyst systems in electrocoat materials. For improving the corrosion control of electrocoat materials DE 100 01 222 A1 cites the use of colloidal bismuth. That German patent uses bismuth salts of aliphatic carboxylic acids. A further use of bismuth salts of organic carboxylic acids is described in an electrocoat material in German patent application DE 44 34 593 A1. Toxic constituents are to be largely avoided in the preparation of that corrosion control coating material. German patent application DE 102 36 350 A1 describes electrocoat materials which comprise bismuth subsalicylate and which flow well, are free from surface defects, and ensure effective corrosion control. These known electrocoat materials, however, require a relatively high baking temperature in order to achieve sufficient crosslinking.

It is an object of the present invention to find new electrocoat materials comprising bismuth compounds, the crosslinking reactions taking place in the electrocoat material of the invention at baking temperatures which are as low as possible.

SUMMARY OF THE INVENTION

Surprisingly it has been found that, when basic bismuth nitrate (also known as bismuth subnitrate) is employed as a crosslinking catalyst, baking of the films deposited on a substrate is possible at relatively low temperatures.

The invention accordingly provides an electrocoat material of the type specified at the outset wherein the bismuth compound is a basic bismuth nitrate.

DESCRIPTION OF THE DRAWING

The FIGURE illustrates, in graph form, the results of testing of the inventive electrocoat materials (EMC1) in comparison to a comparative example of electrocoat materials (ECM2).

DETAILED DESCRIPTION OF THE INVENTION

In light of the prior art it was surprising and unforeseeable for the skilled worker that the object on which the invention is based could be achieved by means of the basic bismuth subnitrates. A particular surprise was that the electrocoat materials of the invention were very easy to produce, were stable on storage, exhibited an optimum particle size in respect of the dispersed constituents, and had very good filterability. They were easy to deposit without problems, electrophoretically, on electrically conductive substrates. The resulting electrocoats had good flow, were free from surface defects and specks, and afforded outstanding corrosion control and edge protection.

European patent applications EP 151 0558 B1 and EP 1 518 906 use a large number of different metal salts, one among them being the bismuth salt of nitric acid, for producing electrocoat materials. The two patents fail, however, to describe the use of basic bismuth nitrates. Nor do the European patents disclose the lowering of the baking temperature as a result of adding the bismuth salts of nitric acid as crosslinking catalysts. Furthermore, bismuth nitrate is readily soluble in water, in contrast to the water-insoluble bismuth subnitrate used in the present specification. Dissolved Bi salts may exhibit certain disadvantages in the electrocoat materials. Soluble salts are taken up in the ultrafiltrate and in that way are continually removed from the electrocoat material. Moreover, following the pretreatment of the bodywork, extraneous ions may be carried into the electrocoating bath. These extraneous ions may deactivate the soluble Bi catalysts (EP 1 342 757).

The electrocoat materials of the invention preferably have a solids content of 5% to 50%, preferably 5% to 35% by weight. The solids here is the fraction of an electrocoat material that builds the electrocoat produced from the material. The electrocoat materials of the invention comprise at least one binder.

The binders contain reactive functional groups which are able to enter into thermal crosslinking reactions with complementary reactive functional groups that are present in crosslinking agents.

The binder contains cationic and/or potentially cationic groups. Binders of this kind are used in cathodically depositable electrocoat materials.

Examples of suitable potentially cationic groups which can be converted into cations by neutralizing agents and/or quaternizing agents are primary, secondary or tertiary amino groups, secondary sulfide groups or tertiary phosphine groups, more particularly tertiary amino groups or secondary sulfide groups.

Examples of suitable cationic groups are primary, secondary, tertiary or quaternary ammonium groups, tertiary sulfonium groups or quaternary phosphonium groups, preferably quaternary ammonium groups or tertiary sulfonium groups, but more particularly quaternary ammonium groups.

Examples of suitable neutralizing agents for the potentially cationic groups are organic and inorganic acids such as sulfuric acid, hydrochloric acid, phosphoric acid, formic acid, acetic acid, lactic acid, dimethylolpropionic acid, citric acid or sulfonic acids, such as amidosulfonic acids and alkanesulfonic acids, such as methanesulfonic acid, for example, more particularly formic acid, acetic acid or lactic acid.

Examples of suitable binders for electrocoat materials are known from publications EP 0 082 291 A1, EP 0 234 395 A1, EP 0 227 975 A1, EP 0 178 531 A1, EP 0 333 327, EP 0 310 971 A1, EP 0 456 270 A1, U.S. Pat. No. 3,922,253 A, EP 0 261 385 A1, EP 0 245 786 A1, EP 0 414 199 A1, EP 0 476 514 A1, EP 0 817 684 A1, EP 0 639 660 A1, EP 0 595 186 A1, DE 41 26 476 A1, WO 98/33835, DE 33 00 570 A1, DE 37 38 220 A1, DE 35 18 732 A1 or DE 196 18 379 A1. These are preferably resins which contain primary, secondary, tertiary or quaternary amino or ammonium groups and/or tertiary sulfonium groups and have amine numbers preferably of between 20 and 250 mg KOH/g and a weight-average molecular weight of 300 to 10 000 daltons. Use is made more particularly of amino (meth)acrylate resins, amino-epoxy resins, amino-epoxy resins with terminal double bonds, amino-epoxy resins with primary and/or secondary hydroxyl groups, amino-polyurethane resins, amino-containing polybutadiene resins or modified epoxy resin/carbon dioxide/amine reaction products.

Examples of suitable reactive functional groups are hydroxyl groups, thiol groups, and primary and secondary amino groups, more particularly hydroxyl groups.

Examples of suitable complementary reactive functional groups are blocked isocyanate groups.

Suitable crosslinking agents are all typical and known crosslinking agents which contain suitable complementary reactive functional groups. The crosslinking agents are preferably selected from the group consisting of blocked polyisocyanates, melamine-formaldehyde resins, tris(alkoxycarbonylamino)triazines, and polyepoxides. More preferably the crosslinking agents are selected from the group consisting of blocked polyisocyanates and highly reactive melamine-formaldehyde resins. Particular preference is given to using the blocked polyisocyanates.

The blocked polyisocyanates are prepared from typical and known paint polyisocyanates having aliphatically, cycloaliphatically, araliphatically and/or aromatically attached isocyanate groups.

Examples of suitable paint polyisocyanates are described for example in "Methoden der organischen Chemie", Houben-Weyl, Volume 14/2, 4th edition, Georg Thieme Verlag, Stuttgart 1963, pages 61 to 70, and by W. Siefken, Liebigs Annalen der Chemie, Volume 562, pages 75 to 136.

Further examples of suitable paint polyisocyanates are polyisocyanates which contain isocyanurate, biuret, allophanate, iminooxadiazinedione, urethane, urea, carbodiimide and/or uretdione groups and which are obtainable from typical and known diisocyanates. Diisocyanates used with preference are hexamethylene diisocyanate, isophorone diisocyanate, 2-isocyanatopropylcyclohexyl isocyanate, dicyclohexylmethane 2,4'-diisocyanate, dicyclohexylmethane 4,4'-diisocyanate or 1,3-bis(isocyanatomethyl)cyclohexane (BIC), diisocyanates derived from dimeric fatty acids, 1,8-diisocyanato-4-isocyanatomethyloctane, 1,7-diisocyanato-4-isocyanatomethylheptane, 1-isocyanato-2-(3-isocyanatopropyl)cyclohexane, 2,4- and/or 2,6-tolylene diisocyanate, 4,4'-diphenylmethane diisocyanate, naphthalene diisocyanate or mixtures of these polyisocyanates.

Examples of suitable blocking agents for preparing the blocked polyisocyanates are i) phenols, such as phenol, cresol, xylenol, nitrophenol, chlorophenol, ethylphenol, tert-butylphenol, hydroxybenzoic acid, esters of this acid or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, methyl or ethyl acetoacetate or acetylacetone;

iv) alcohols such as methanol, ethanol, n-propanol, isopropanol, n-butanol, isobutanol, tert-butanol, n-amyl alcohol, tert-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyl-dimethanol or acetocyanohydrin;

v) mercaptans such as butyl mercaptan, hexyl mercaptan, tert-butyl mercaptan, tert-dodecyl mercaptan, 2-mercaptobenzothiazole, thiophenol, methylthiophenol or ethylthiophenol;

vi) acid amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethylenimine;

xiii) oximes such as acetone oxime, formaldoxime, acetaldoxime, acetoxime, methyl ethyl ketoxime, diisobutyl ketoxime, diacetone monoxime, benzophenone oxime or chlorohexanone oximes;

xiv) salts of sulfurous acid such as sodium bisulfite or potassium bisulfite;

xv) hydroxamic esters such as benzyl methacrylohydroxamate (BMH) or allyl methacrylohydroxamate; or xvi) substituted pyrazoles, imidazoles or triazoles; and also xvii) 1,2-polyols such as ethylene glycol, propylene glycol, and 1,2-butanediol;

xviii) 2-hydroxy esters such as 2-hydroxyethyl acrylate, 2-hydroxyethyl methacrylate;

xix) mixtures of these blocking agents.

In accordance with the invention the electrocoat materials of the invention comprise bismuth subnitrate of the empirical formula 4(BiNO$_3$(OH)$_2$)BiO(OH). The bismuth content to DAB [German Pharmacopoeia] 7 is from 71% to 74% by weight. Bismuth subnitrate is a commercial compound and is sold by the company MCP HEK GmbH, Lubeck, Germany, for example. The electrocoat materials of the invention, based on their solids content, contain preferably 0.05% to 5%, more preferably 0.1% to 4%, and more particularly 0.2% to 3% by weight of bismuth subnitrate.

The electrocoat materials of the invention may further comprise at least one typical and known additive, selected from the group consisting of catalysts other than bismuth subnitrate, pigments, anticrater additives, polyvinyl alcohols, thermally curable reactive diluents, molecularly dispersely soluble dyes, light stabilizers, such as UV absorbers and reversible free-radical scavengers (HALS), antioxidants, low-boiling and high-boiling ("long") organic solvents, devolatilizers, wetting agents, emulsifiers, slip additives, polymerization inhibitors, thermolabile free-radical initiators, adhesion promoters, flow control agents, film-forming assistants, flame retardants, corrosion inhibitors, free-flow aids, waxes, siccatives, biocides, and matting agents, in effective amounts.

Further examples of suitable additives are described in the text book "Lackadditive" [Additives for Coatings] by Johan Bieleman, Wiley-VCH, Weinheim, New York, 1998, in D. Stoye and W. Freitag (Editors), "Paints, Coatings and Solvents", Second, Completely Revised Edition, Wiley-VCH, Weinheim, New York, 1998, "14.9. Solvent Groups", pages 327 to 373.

Pigments are preferred additives employed. Preferably the pigments are selected from the group consisting of typical and known coloring, effect, electrically conductive, magnetically shielding, fluorescent, extending, and corrosion-inhibiting organic and inorganic pigments.

The electrocoat materials of the invention are produced by mixing and homogenizing the above-described constituents and, if appropriate, using typical and known mixing methods and apparatus such as stirred tanks, agitator mills, extruders, compounders, Ultraturrax, inline dissolvers, static mixers, micromixers, toothed-wheeled dispersers, pressure release nozzles and/or microfluidizers. In this case the pigments are incorporated preferably in the form of pigment pastes or pigment preparations into the electrocoat materials (cf. Römpp Lexikon Lacke and Druckfarben, Georg Thieme Verlag, Stuttgart, New York, 1998, "Pigment preparations", page 452). Another particular advantage of the bismuth subnitrate used according to the invention is that it is outstandingly incorporable into the pigment pastes and into the electrocoat materials of the invention.

Cathodic deposition from the electrocoat materials of the invention can be carried out typically on electrically conductive substrates, examples being substrates which are electrically conductive or have been made conductive, specific examples being plastic substrates which have been made electrically conductive by metallization, or, in particular, on metallic substrates. The invention hence also provides the method of cathodic deposition of the electrocoat materials of the invention on the corresponding substrates. Metallic substrates which can be used are parts of all typical metals, examples being the metal parts that are typical in the automobile industry, more particularly automobile bodies and their parts.

The invention is illustrated below with reference to an inventive example and a comparative example.

EXAMPLE 1

1.1 Preparation of the Crosslinking Agent C1

Example 1 from DE 197 03 869

A reactor equipped with a reflux condenser, internal thermometer, and inert gas inlet is charged with 1084 parts of isomers and higher polyfunctional oligomers based on 4,4-diphenylmethane diisocyanate, with an NCO equivalent weight of 135 (Basonat® A270, BASF AG) under a nitrogen atmosphere. 0.6 part of dibutyltin dilaurate is added and 1314 parts of butyl diglycol are added dropwise at a rate such that the product temperature remains below 70° C. It may be necessary to cool the mixture. The temperature is held at 70° C. for a further 120 minutes. When a check is subsequently made, NCO groups are no longer detectable. The mixture is cooled to 70° C. The solids content is >97%.

1.2 Preparation of the Aqueous Binder Dispersion D1

Example 2.3 from DE 197 03 869

A reactor equipped with a reflux condenser, internal thermometer, and inert gas inlet is charged with 1128 parts of a commercial epoxy resin based on bisphenol A with an epoxide equivalent weight (EEW) of 188.94 parts of phenol, and 228 parts of bisphenol A and this initial charge is heated to 130° C. under nitrogen. 1.5 g of triphenylphosphine are added with stirring, whereupon there is an exothermic reaction and the temperature climbs to 160° C. The temperature is allowed to cool again to 130° C., after which the EEW is checked. The target figure is 478. Then 15.7 parts of Plastilit 3060 (BASF AG) are added with simultaneous cooling. At 95° C. 115.5 parts of diethanolamine are added, whereupon there is an exothermic reaction. After 40 minutes 61.2 parts of N,N-dimethylaminopropylamine are added. After a brief exotherm (140° C.) the batch is allowed to continue reaction at 130° C. for 2 hours, until the viscosity remains constant.

Stirred rapidly into the resulting reaction mixture are 97.6 parts of butyl glycol and 812 parts of the hot solution at 70° C. of the crosslinking agent C2, and the resulting mixture is discharged at 105° C.

2400 parts of the resulting mixture are immediately incorporated by dispersion into an initial charge consisting of a mixture of 2173 parts of demineralized water and 49.3 parts of glacial acetic acid. The addition of a further 751 parts of demineralized water produces a stable dispersion having the following characteristics:
Solids (60 min/130° C.): 45.1%
pH: 5.9
Average particle size: 145 nm 1.3 Preparation of the Grinding Resin Solution G1

In accordance with EP 505 445 B1, Example 1.3, a grinding resin is produced which for greater ease of handling is additionally neutralized and diluted with 2.82 parts of glacial acetic acid and 13.84 parts of fully demineralized water. The original solids content is thereby lowered to 60%.

1.4 Preparation of Aqueous Pigment Pastes

1.4.1 Pigment Paste P1

Inventive Pigment Paste

The following components are added in succession to a high-speed dissolver-stirrer and mixed for 30 minutes:

| | |
|---|---|
| 32.3 parts | demineralized water |
| 24.1 parts | grinding resin solution G1 |
| 5.6 parts | |
| 0.6 part | carbon black |
| 32.7 parts | titanium dioxide (TI-PURE R 900, DuPont) |
| 4.7 parts | bismuth subnitrate (Bi content 71-74%; supplier, e.g., HEK-Lübeck) |

The mixture is subsequently dispersed to a Hegman particle size of 12 µm for 1-2 h in a laboratory stirrer mill, and if necessary is adjusted with further water to the desired processing viscosity.

1.4.2 Pigment Paste P2

Comparative Example

The method indicated under 1.4.1 is used to prepare the pigment paste 2, in which, however, the bismuth subnitrate is replaced by 6.0 parts of bismuth subsalicylate (Bi content 56-59%, HEK-Lübeck).

1.5 Production of the Electrocoat Materials

For testing as cathodically depositable electrocoat materials, the aqueous binder dispersions and pigment pastes described are combined in accordance with the table below. The procedure here is to introduce the binder dispersion as an initial charge and to dilute it with deionized water. Subsequently, with stirring, the pigment paste is introduced. The figures quoted are weight fractions.

| Electrodeposition coating material (ECM) | ECM 1 | ECM 2 |
|---|---|---|
| Binder dispersion D1 | 2114 | 2114 |
| Pigment paste P1 | 294 | |
| Pigment paste P2 | | 294 |
| Demineralized water | 2592 | 2592 |

2. Testing of the Electrocoat Materials

The inventive electrocoating baths are aged at room temperature with stirring for 24 h. The electrocoat materials are deposited on zinc-phosphatized steel panels connected as cathodes. The deposition time is 120 s at a bath temperature of 32° C. The deposition voltage is selected so as to give a baked paint film thickness of 20 µm.

The paint film deposited is rinsed with deionized water and baked for 15 minutes at the specified temperature.

The state of crosslinking of the baked paint films was tested by determining their resistance to butanone solvent (methyl ethyl ketone) in accordance with DIN EN 13523-11 (rub test). This was done by determining the number of double rubs for which significant damage was apparent to the paint film. In the case of the maximum figure of 100 double rubs, the paint film was evaluated as satisfactory.

Table 1 and the FIGURE set out the results for the inventive electrocoat material (ECM1) and that of the comparative example (ECM2) for different baking temperatures.

From the data it is apparent that the crosslinking reaction in the electrocoat material of the invention is sufficient at baking temperatures which are lower by 5-10° C.

TABLE 1

Solvent resistance (DIN EN 13523-11, MEK rub test)

| | Double rubs with MEK | |
|---|---|---|
| Baking temp. | ECM1 (inventive) | ECM2 (comparative example) |
| 150° C. | 6 | 4 |
| 155° C. | 34 | 18 |
| 160° C. | 70 | 24 |
| 165° C. | 100 | 50 |
| 170° C. | 100 | 100 |
| 175° C. | 100 | 100 |

What is claimed is:

1. A method of electrocoating a substrate, comprising applying to a substrate having one or more electrically conductive surfaces in a cathodic electrodeposition process a cathodically depositable electrocoat material produced by a process comprising mixing and homogenizing at least one binder, at least one crosslinking agent, and a bismuth nitrate crosslinking catalyst consisting of a water-insoluble basic bismuth nitrate, and baking the electrocoat material at a temperature which is at least 5-10° C. lower than a baking temperature of an electrocoat material which is devoid of the water insoluble basic bismuth nitrate and sufficient to produce a same or similar degree of crosslinking as the electrocoat material.

2. The method of claim 1 wherein the applied electrocoat material produces a primer coat.

3. The method of claim 1 wherein the substrate comprises a motor vehicle or part thereof.

4. A method of crosslinking a cathodically depositable electrocoat material, comprising using a water-insoluble basic bismuth nitrate as a crosslinking catalyst in the absence of water-soluble bismuth salts in the cathodically depositable electrocoat material and baking the electrocoat material at a baking temperature that is at least 5-10° C. lower than a baking temperature of an electrocoat material which is devoid of the water-insoluble basic bismuth nitrate and sufficient to produce a same or similar degree of crosslinking as the electrocoat material.

* * * * *